Figure 1:
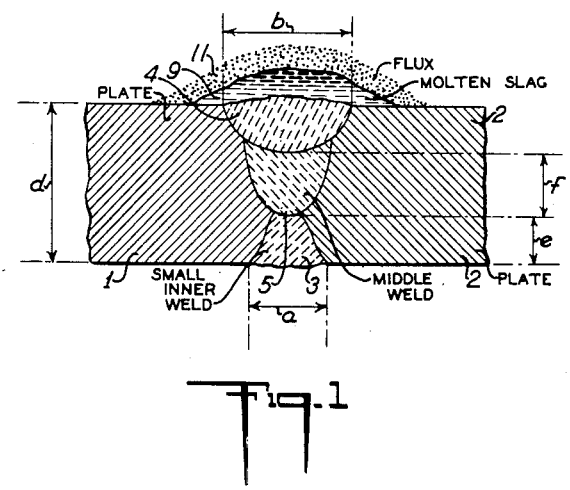

INVENTOR
MAX KOMERS
HERMANN PÖTZL

BY Burgess & Dinkelage

ATTORNEYS

Patented Dec. 2, 1952

2,620,423

UNITED STATES PATENT OFFICE 2,620,423

METHOD OF ELECTRIC WELDING

Max Komers, Muelheim-on-the-Ruhr, and
Hermann Pötzl, Munich, Germany

Application March 30, 1950, Serial No. 152,826
In Germany October 10, 1949

5 Claims. (Cl. 219—10)

This invention relates to a method for the welding of steel pieces having a large cross-section. It more particularly relates to the welding of steel plates with a relatively large thickness according to the so-called "union-melt process" or "submerged-arc welding process."

In a conventional arc welding process with, for example, the use of a normal automatic bare wire welding machine, a bare welding wire is run off from a normal ring and fed to the welding seam, where it is ignited and burns off in an electric arc. As contrasted to this conventional process in submerged-arc welding process, the wire is inserted in a large quantity of a suitable flux placed on the welding spot, so that the welding process takes place submerged in this flux away from the air and no arc becomes visible. The current in this union melt process is supplied to the wire at a point very close to the welding spot, so that the wire has a high load capacity.

The submerged arc welding process or union melt process has the advantage that large amounts of wire may be melted down or deposited in a given period of time. It is thus possible to weld thick cross-sections of material in one layer, or as is required in the welding of boilers, in two layers in a substantially shorter period of time. By using the submerged-arc welding process, it becomes possible to weld steel plates of a thickness of up to about 55 mm. in a faultless manner. It is generally conventional to use a non-symmetrical seam for the welded bond. Thus, for example, in welding a boiler, a smaller weld is first made on the inside with a small welding head. Then the main weld is deposited from the opposite side by means of a large welding head and a correspondingly higher current density. The main layer penetrates so deeply that an overlapping of the two layers is obtained and a complete and thorough welding of the seam is assured. The use of a symmetrically welded X-seam was generally limited to the inner welding of hollow bodies of normal diameter. No welding heads were available which would permit a reliable welding throughout the cross-section of plates of 60 mm. thickness.

Difficulties are also encountered in the welding of plates of a larger thickness when using the submerged-arc welding process. In this process the formation of a stem-shaped crystal structure is typical. It is, of course, possible to fill large seams, but during the solidification of welding baths of such a large size, the crystallization stem passing through the middle of the weld becomes so pronounced that the mechanical properties of the weld are unfavorably affected, even after a faultless normalizing annealing. During the shrinking which takes place during and after the solidification, cracks can easily occur in the large weld. In addition, the surface of such a large weld becomes very irregular and contains ridges, so that considerable finishing work is necessary. Such large welds also cause intensive local overheating, which will unfavorably effect the solidifying process. The liquid slag produced from the powder, in the case of very high current intensities, is no longer able to assure a continuous degasification of the weld, so that by the intermittent boiling or puffing of the bath, very irregular scaly, solidified formations of the surface occur. This is most noticeable with the use of flux of a less acidic nature. It is, of course, very desirable to use these types of fluxes or welding powders, since they considerably reduce the wastage of manganese and make it possible to use additional wires containing less manganese, and thus to increase the economy of the process.

Prior to the present invention, attempts to remove these difficulties were not successful. These attempts included, for example, the production of large welds in several layers. If, however, one layer is welded which does not fill up the trough between the abutting ends of the plates to the top, and this layer is covered by one or two superimposed layers, cracks will tend to occur along the trans-crystallation branches of the main layer, which are dangerous, since they cannot be found by X-ray or the like. In addition, the method of welding thick plates in many single layers by the submerged-arc welding process, as, for example, welding a plate of 80 mm. thickness in 15 layers, is not satisfactory. It is difficult to apply the first layers so that they will be free from cracks. Of primary importance, however, is that, by effecting the welding in many layers, one of the main advantages of the submerged-arc welding process, i. e., high-speed operation, is substantially reduced.

Figure 2:
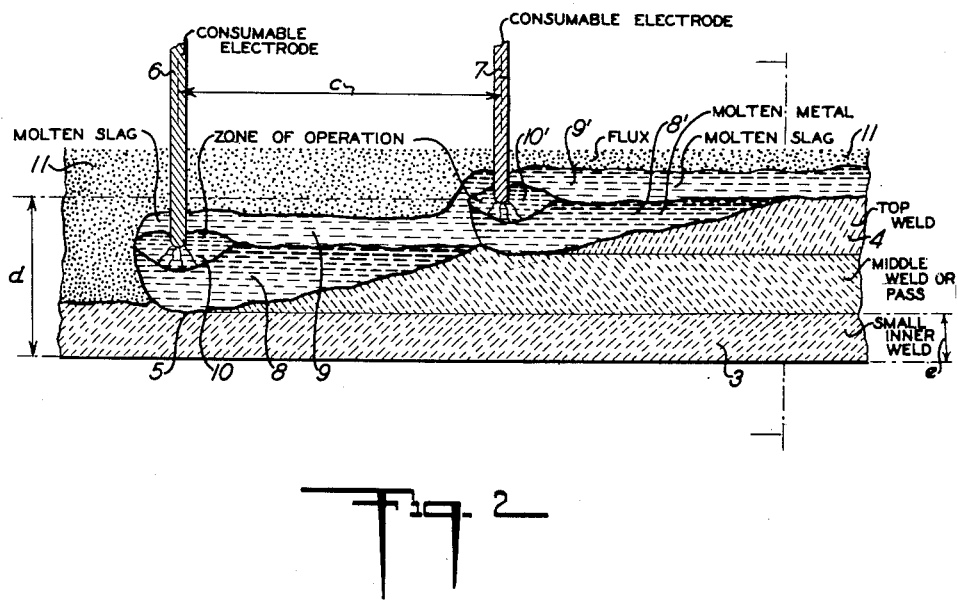

One object of this invention is to overcome the above-mentioned difficulties in the submerged-arc welding process. This, and still further objects will become apparent from the following description, read in conjunction with the drawing, in which:

Fig. 1 shows a cross-sectional view of a seam produced in accordance with the invention; and Fig. 2 diagrammatically shows a typical, longitudinal section of the seam shown in Fig. 1 during the welding process.

In accordance with the invention, seams on thick plates with a cross-section of 55 mm. or more, are welded in a faultless manner in one traverse or "pass" with two successive welding heads in such a way that at least the major portion of the steel bath produced by the preceding electrode in the bottom or depth of the welded seam is already solidified before the succeeding electrode is consumed or melted off in the still liquid slag and the still liquid residual melt, if any, of the preceding electrode.

In this manner the seam is filled in a single pass, and the advantages of high-speed operation are maintained. In order to produce a favorable metallurgical effect in accordance with the invention, care must be taken that there is a sufficient distance between the electrodes so that the welded seam from the preceding electrode is already solidified before the succeeding electrode is consumed or melted off in the liquid slag. The formation of a uniform large melting bath must in all cases be avoided, as would be produced if a plurality of electrodes were melted off side by side or with an insufficient distance behind each other. By the manner of operation in accordance with the invention, the solidifying process of the whole welding material is influenced in such a way that the formation of the critical "crystallization stem" extending through the middle of the weld, is avoided. This results in more favorable mechanical properties of the welding work, and the conditions which lead to the formation of cracks due to the shrinking, are substantially suppressed. In addition, a welding bead having a much smoother surface is obtained. The welding with several welding heads offers the advantage that the amount of energy required for welding thick plates is distributed over two or more electrodes and intensive local overheating is avoided. This allows the degasification to proceed quietly and no bubbling or puffing occurs and a smooth surface is thus obtained. This smooth surface is generally comparable to the surface produced in the submerged-arc welding of thinner iron sheets.

In accordance with the invention it is therefore possible to use powders or fluxes of a less acidic character, as, for example, with less than 40% $SiO_2$. Therefore with the welding of thick plates with fluxes of this type in accordance with the invention, there is less wastage of manganese and the economy of the operation is increased.

The metallurgical advantage of the process according to the invention resides in the fact that the uniform solidification of the large volume of welding bath is avoided. The process is subdivided by the second electrode, or by the further electrodes, in such a way that at least a major portion of the metal bath formed by the previous electrode has solidified before the metal from the next following electrode is deposited. The solidification is carried on continuously in this manner until the seam is completely filled up. Overheating is avoided to such an extent that the crystal formation takes a much more favorable course. It is important in accordance with the invention to adapt the currents of voltages of the single electrodes to each other in an appropriate manner and to adjust the proper distance between the electrodes, depending on the welding speed. Any of the known shapes of welding seams can be applied for the process of the invention.

It is possible to weld with a symmetrical X- shaped seam, especially where both sides of the seam are welded in accordance with the process of the invention. Preferably, when welding with two or more welding heads, each of the heads is provided with means for independent regulation of the current and voltage. Since it is possible to effect the process with the use of direct current, the sources of current conventionally used, i. e., converters or transformers, may be used in accordance with the invention. When using alternating current, the usual two- or multi-phase connections are used, preferably for all electrodes. When operating with direct current, the connections may be so arranged that the different electrodes have the same or different polarity.

The invention will be further explained with reference to the drawings.

The drawings illustrate the welding of a boiler course consisting of two plates 1 and 2 of a thickness "d" of 80 mm. or $3\frac{5}{32}$. The seam is in the form of a non-symmetrical X- or double V-weld in which the smaller inner weld or pass 3 has a seam width "a" of about 25 mm., while the width between the abutting edges of the plates 1 and 2 at the narrowest point or bottom 5 is about 10 mm. and the width "b" of the large outer seam 4 is about 40 mm. At first the smaller seam 3 was welded by means of an inner welding head (not shown) and a wire of a thickness of, say, 7 mm. diameter, the current being about 1700 amperes, 37 volts, and the rate of welding being about 20 cm. per minute, whereby the bottom 5 was melted up about one-half. Since the bottom portion 5 begins about 20 mm. from the inside, a depth "e" of about 25 mm. had to be filled up by the welding material. In order to ensure a reliable welding which would penetrate the whole cross-section of the plate, about 60 mm. had to be filled up by welding from the opposite side. For welding this large outer layer, two welding heads were used, the first of which was fitted with an electrode 6 of 8 mm. thickness, while the second one was fitted with an electrode 7 of 7 mm. thickness, as shown in Fig. 2. The distance "c" between the two electrodes in case of a welding speed of about 15 cm. per minute amounted to about 17 cm. At first, the electric arc of the electrode 6 was ignited in the usual manner by means of 2,400 amperes and about 48 volts. As soon as the second electrode 7 had reached the bath of the first electrode 6 and could dip into the same, the second electrode was supplied with about 1250 amperes and 45 volts, whereupon the ignition of the electric arc took place automatically and the wire was melted off. The welded seam showed a very favorable crystal formation without any cracks. The melted welded work of the first electrode 6 is indicated by the hatched area 8, and the slag bath thereof by the hatched area 9. The zone of operation of the electrode 6 is indicated by the area 10. The corresponding areas of the second electrode 7 are marked 8', 9', and 10', and the flux is indicated at 11.

It will be understood that in accordance with the invention it is also possible to weld by means of two electrodes of equal thickness or by means of one electrode 6 of 10 mm. thickness and a second electrode 7 of 8 mm. thickness. Care has to be taken, however, that the electric current density and voltage are chosen in such a way that the first electrode 6 melts into a corresponding depth (at least 20 mm. distance from the inner side) and that the second electrode 7 fills up the remaining cross-section of the seam in such a way that the bath of the first electrode, at least a major portion of which must be solidified, is at most partly re-melted so that formation of the characteristic crystallization stem is prevented, and accordingly the danger of the formation of cracks in the large weld is avoided. It is possible, moreover, to provide welding heads, for instance, a third welding head, so as to further subdivide the solidification process. It is very easy for a man skilled in the art of submerged-arc welding, possibly after a preliminary test, to find out the proper current conditions in each case. The spacing between the individual electrodes in this case depends on the speed of welding, since the higher the welding speed, the faster the solidification of the bath must take place, and accordingly the distance of the electrodes must be larger. It has been found appropriate to increase the welding speed in comparison to the welding with one head only if the operating conditions selected would permit such an increase with a view to the metallurgical conditions. For carrying out the two- and multi-head welding, it is desirable in most instances to provide means for adjusting the distance of the single electrodes from each other within a range of 50 to 250 mm. It will be possible for a man skilled in the art, after understanding the method of welding according to the present invention, to design and construct appropriate apparatuses for the welding with two or more welding heads in accordance with the present invention and to provide suitable electric connections therefor. Hence, it will not be necessary to specifically describe such apparatuses and diagrams of connection.

As mentioned above, the difficulties which are removed by the present invention may especially occur in the submerged-arc welding of steel plates of more than about 55 mm. thickness. It will be understood, however, that the method according to the invention can also be applied successfully for the welding of plates of a smaller thickness. As a matter of fact, the crystallisation conditions are also improved in the welding, for example, of a plate of 30 mm. thickness.

While the invention has been described in detail with respect to a now-preferred example and embodiment of the invention, it will be understood by those skilled in the art after understanding the invention, that various changes and modifications may be made without departing from the spirit and scope of the invention, and it is intended, therefore, to cover all such changes and modifications in the appended claims.

Having thus described our invention, we claim as new and desire to secure by Letters Patent:

1. In a method of submerged arc welding of steel pieces having large cross sections, the steps which comprise causing relative movement between at least two spaced-apart electrodes and such steel pieces, depositing fused electrode metal from the leading electrode, allowing at least a major portion of the deposited metal to become solidified, depositing fused metal from the following electrode on said solidified fused metal from the leading electrode, by melting said following electrode in the liquid slag, and, if any, the liquid residual melt of the preceding electrode, and correlating the spacing between the electrodes so that the previously deposited layer of welded metal substantially remains solidified.

2. Method according to claim 1 in which the currents and voltage supplied to the leading electrode is greater than the current and voltage supplied to the following electrode.

3. Method according to claim 1 in which the weld produced is about 60 mm. in depth, the leading electrode being supplied with about 2,400 amps. and about 48 volts, the following electrode being supplied with about 1,250 amps. and about 45 volts and spaced about 17 cms. from said leading electrode.

4. Method according to claim 1 in which a flux is used which contains less than 40% $SiO_2$.

5. Method according to claim 1 in which the steel pieces are steel plates having a thickness in excess of 55 mms.

MAX KOMERS.
HERMANN PÖTZL.

REFERENCES CITED

The following references are of record in the file of this patent:

UNITED STATES PATENTS

| Number | Name | Date |
|---|---|---|
| 1,496,333 | Woolard | June 3, 1924 |
| 2,228,639 | Miller | Jan. 14, 1941 |
| 2,320,824 | Landis et al. | June 1, 1943 |
| 2,489,002 | Babbitt | Nov. 22, 1949 |